United States Patent

Kouzel et al.

[11] Patent Number: 5,180,003
[45] Date of Patent: Jan. 19, 1993

[54] DUAL FAN COOLING SYSTEM

[75] Inventors: Richard L. Kouzel, Garner, N.C.;
Aubery W. Penn, Washington, Ill.;
Brian D. Jensen, Dunlap, Ill.; Paul A.
Dicke, Peoria, Ill.

[73] Assignee: Caterpillar Inc., Peoria, Ill.

[21] Appl. No.: 838,278

[22] PCT Filed: Jan. 4, 1990

[86] PCT No.: PCT/US90/00084

§ 371 Date: Jan. 14, 1992

§ 102(e) Date: Jan. 14, 1992

[87] PCT Pub. No.: WO90/07759

PCT Pub. Date: Jul. 12, 1990

[51] Int. Cl.$^5$ ............................................. F28F 13/06
[52] U.S. Cl. ................................. 165/121; 123/41.49;
180/68.1
[58] Field of Search ..................... 165/121, 122;
123/41.49; 180/68.1

[56] References Cited

U.S. PATENT DOCUMENTS

| | | | |
|---|---|---|---|
| 1,263,227 | 4/1918 | George et al. | 123/41.49 |
| 1,306,976 | 6/1919 | Searles | 165/121 |
| 1,576,833 | 3/1926 | Larsen | 165/122 |
| 1,920,883 | 8/1933 | Perkins | 123/41.49 |
| 3,309,847 | 3/1967 | Donaldson | 55/268 |
| 3,840,067 | 10/1974 | Bos | 165/1 |
| 4,382,481 | 5/1983 | Moore | 180/54 A |
| 4,738,327 | 4/1988 | Takei | 180/68.1 |
| 4,909,311 | 3/1990 | Nakamura et al. | 165/41 |
| 4,938,303 | 7/1990 | Schaal et al. | 180/68.1 |

FOREIGN PATENT DOCUMENTS

| | | |
|---|---|---|
| 3612167C2 | 8/1991 | Fed. Rep. of Germany . |
| 1286795 | 1/1987 | U.S.S.R. . |
| 1574859 | 6/1990 | U.S.S.R. ............................ 123/41.49 |
| 2041850A | 9/1980 | United Kingdom . |

Primary Examiner—Allen J. Flanigan
Attorney, Agent, or Firm—Diana L. Charlton

[57] ABSTRACT

Cooling systems are necessary to cool fluid circulated through an internal combustion engine so that engine temperatures can be controlled. The subject dual fan cooling system increases the air flow through a heat exchanger (40) by utilizing a primary fan and a secondary fan (50, 82). The primary fan (50) is located on one side of the heat exchanger (40) and pushes air through the heat exchanger (40) while the secondary fan (82) is located on the opposite side of the heat exchanger (40) and pulls air through the heat exchanger (40). The secondary fan (82) is rotatably mounted in a substantially concentric relation with the primary fan (50) to pull air through the heat exchanger (40) at the area (L) of lowest air flow. The secondary fan (82) also substantially eliminates the recirculation of air back through the heat exchanger (40). A shroud (86) encompasses the secondary fan (82) to substantially block air pushed through the heat exchanger (40) by the primary fan (50) from the secondary fan (82).

14 Claims, 4 Drawing Sheets

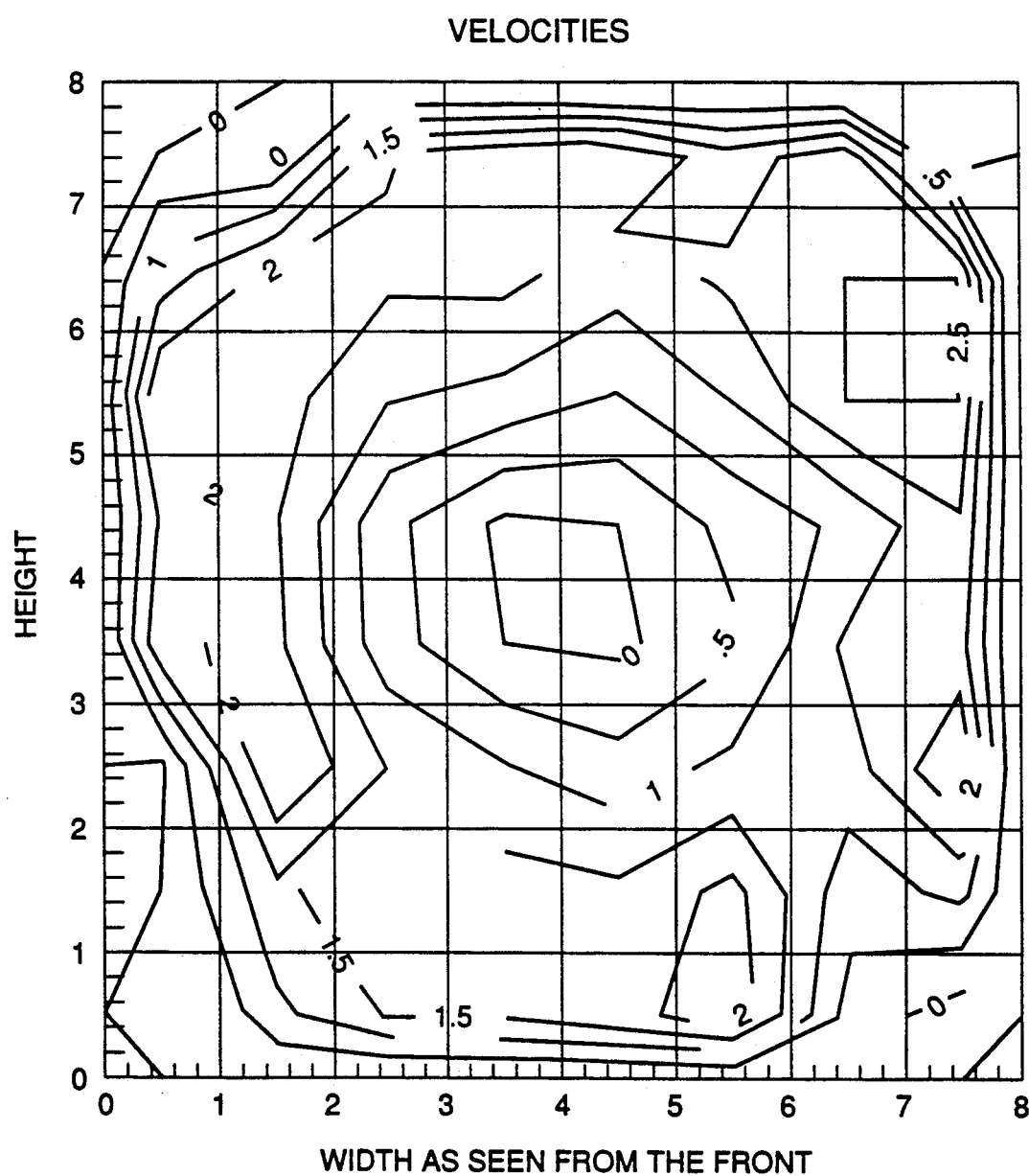

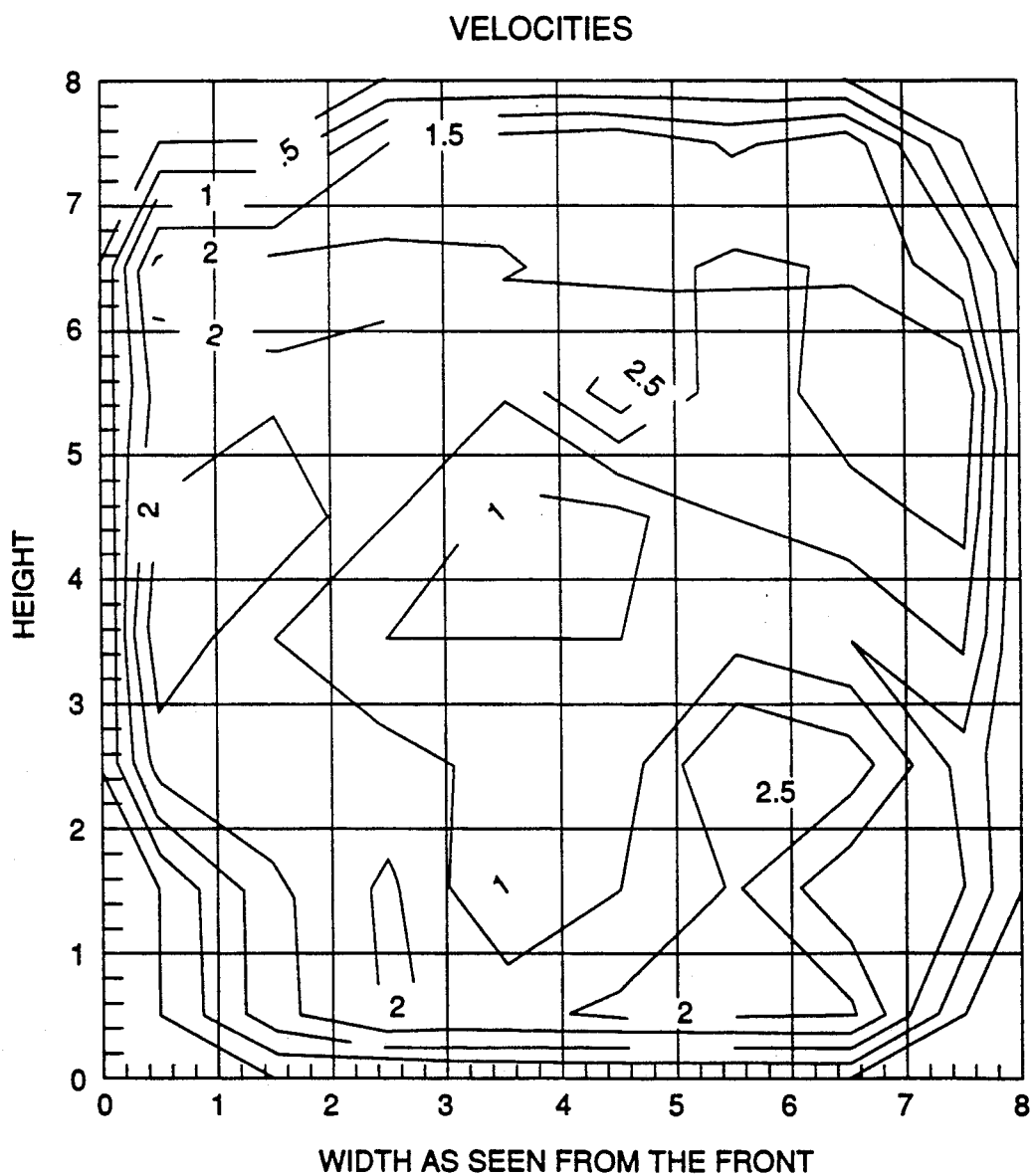

DUAL FAN COOLING SYSTEM

TECHNICAL FIELD

This invention relates to cooling systems for an internal combustion engine and more particularly to a dual fan cooling system therefor.

BACKGROUND ART

Since the advent of water cooled internal combustion engines, it has been an ongoing quest to improve air flow capabilities of the cooling systems, and thereby, increase overall cooling system performance. In a conventional cooling system, a single axial flow fan pushes air through the heat exchanger. In highly loaded systems, air velocity is typically greatest at the tips of the fans blades, and therefore, air flow is greatest through that corresponding area of the heat exchanger, generally at the heat exchanger's perimeter. In comparison, air velocity is typically lowest near the center of the fan, and therefore, air flow is lowest through that corresponding area of the heat exchanger, generally at the central portion of the heat exchanger. Air flow through the heat exchanger may even be substantially zero at the area corresponding to the exact center of the fan. Another disadvantage of the conventional system is the air already pushed through the greater air flow area may be recirculated back through the heat exchanger via the lesser air flow area. These conditions reduce the overall performance of the cooling system compared to the performance that would exist if the air velocities were uniform across the face of the heat exchanger.

The cooling systems for some internal combustion engines have incorporated dual fans in order to improve overall performance and air flow capabilities of current conventional single fan cooling system designs while also allowing various heat exchanger shapes. The dual fans are arbitrarily mounted to push or pull air through the heat exchangers. One of the problems encountered therewith is that the arbitrary mounting of the dual fans may not position the fans at the necessary locations to produce the most effective air flow through the heat exchanger.

Other known cooling systems have a first fan to push or pull air through the heat exchanger and a second fan to push or pull air through a separate area of a vehicle such as through a separate engine compartment. Since the second fan evacuates the hot air within the engine compartment, the hot air does not pass through the cooling system, thus improving performance. However, using two fans in this manner does not improve the air flow capabilities through the heat exchanger although cooling system performance may be increased due to the cooler air passing through the heat exchanger.

The present invention is directed to overcoming one or more of the problems as set forth above.

DISCLOSURE OF THE INVENTION

In one aspect of the present invention, a dual fan cooling system is provided for improved cooling system performance. The system includes a heat exchanger, a primary fan, and a secondary fan. The primary fan has a predetermined diameter and is rotatably mounted on one side of the heat exchanger for pushing air through the heat exchanger in a preselected direction. The primary fan has a peripheral portion which produces an area of greatest air flow through the heat exchanger and a central portion which produces an area of lowest air flow through the heat exchanger. The secondary fan has a diameter smaller than the diameter of the primary fan and is rotatably mounted on the opposite side of the heat exchanger at a location sufficient for pulling air through the heat exchanger at the area of lowest air flow in the preselected direction and for substantially eliminating recirculation of air through the heat exchanger in the opposite direction.

The present invention is desirable in that the dual fan cooling system positions the secondary fan at a location sufficient for pulling air through the lowest air flow area of the heat exchanger. By locating the secondary fan so that air is pulled through the lowest air flow area of the heat exchanger, the invention improves the overall air flow capabilities, and therefore, the cooling system performance while substantially eliminating the possibility of air being recirculated back through the heat exchanger. Consequently, the present dual fan cooling system provides similar performance to that of a significantly larger single fan cooling system.

In addition to the above advantages, the secondary fan may be easily adaptable to an existing single fan cooling system for increased performance and air flow through the heat exchanger without changing the heat exchanger size.

BRIEF DESCRIPTION OF THE DRAWINGS

FIG. 3 is an air velocity diagram for a heat exchanger of a conventional single fan cooling system.

FIG. 4 is an air velocity diagram for a heat exchanger used in conjunction with the present invention.

BEST MODE FOR CARRYING OUT THE INVENTION

A vehicle is partially illustrated at 10 and includes a guard assembly 12 having a pair of frame members 14,16 connected to the vehicle main frame (not shown) in a conventional manner. A grill 24 is conventionally mounted to the guard assembly 12 by a plurality of bolts, one of which is shown at 26. The frame members 14,16 each have a pair of supports 28,30,32,34 suitably welded to the frame members 14,16.

Figure 2:
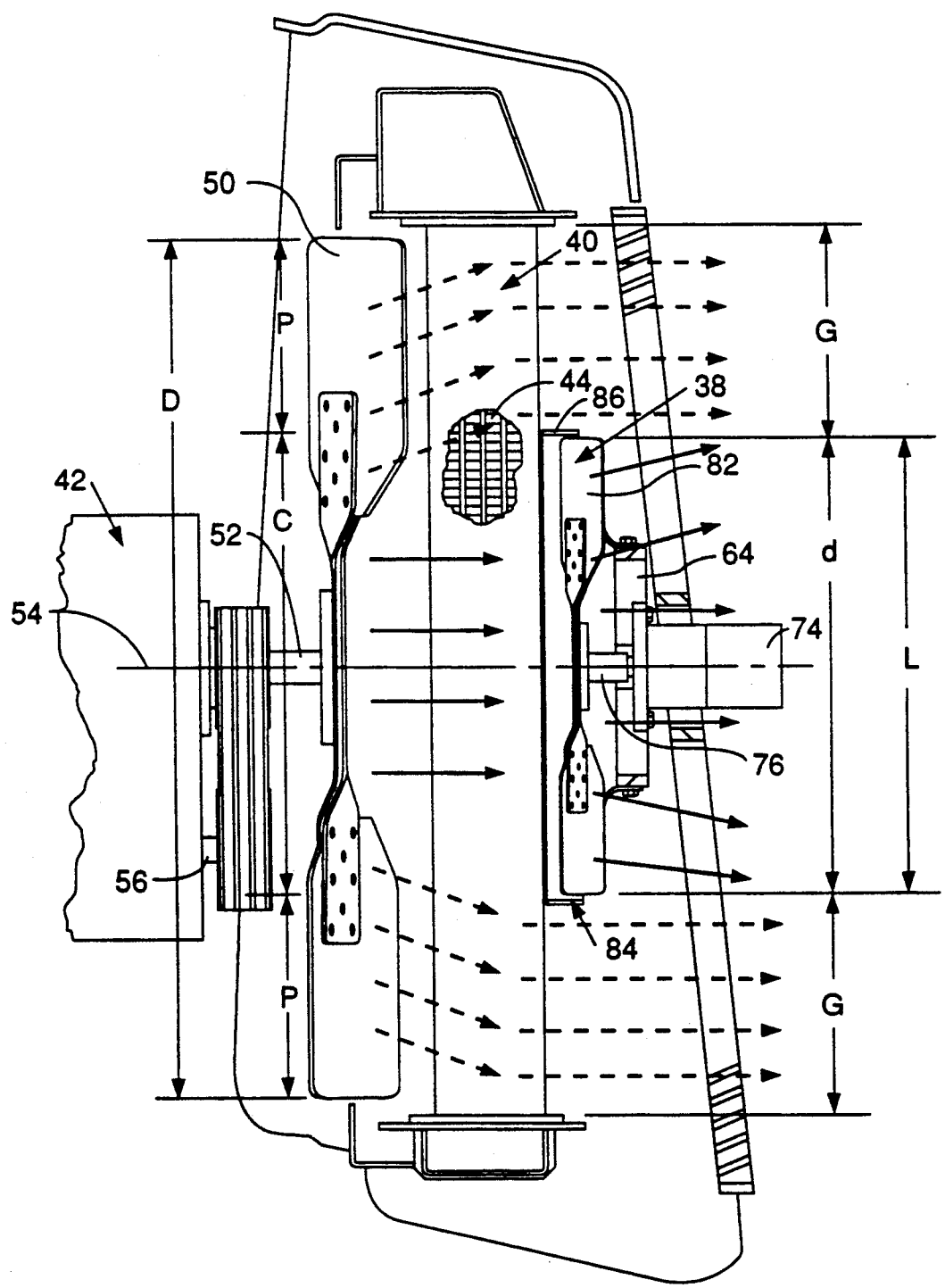
FIG. 2 is a diagrammatic sectional view taken along line 2—2 of FIG. 1.

A dual fan cooling system 38, more clearly shown in FIG. 2, includes a heat exchanger 40 mounted in a conventional manner to the guard assembly 12. Fluid is circulated through the heat exchanger 40 to cool an internal combustion engine 42 during operation. The heat exchanger 40 has a conventional fin and tube section 44 and would include any other devices as needed to circulate the fluid through the heat exchanger 40. A primary fan 50 having a diameter D is conventionally mounted on one side of the heat exchanger 40 on a shaft 52 extending from the engine 42 and having an axis 54. The shaft 52 is rotated by a conventional method, such as by being belt driven through a crankshaft 56, enabling the primary fan 50 to push air through the heat exchanger 40 in the direction given by the arrows shown in broken lines. The primary fan 50 has a peripheral portion P which produces an area G of greatest air flow through the heat exchanger 40 and a central portion C which produces an area L of lowest air flow through the heat exchanger 40.

Figure 1:
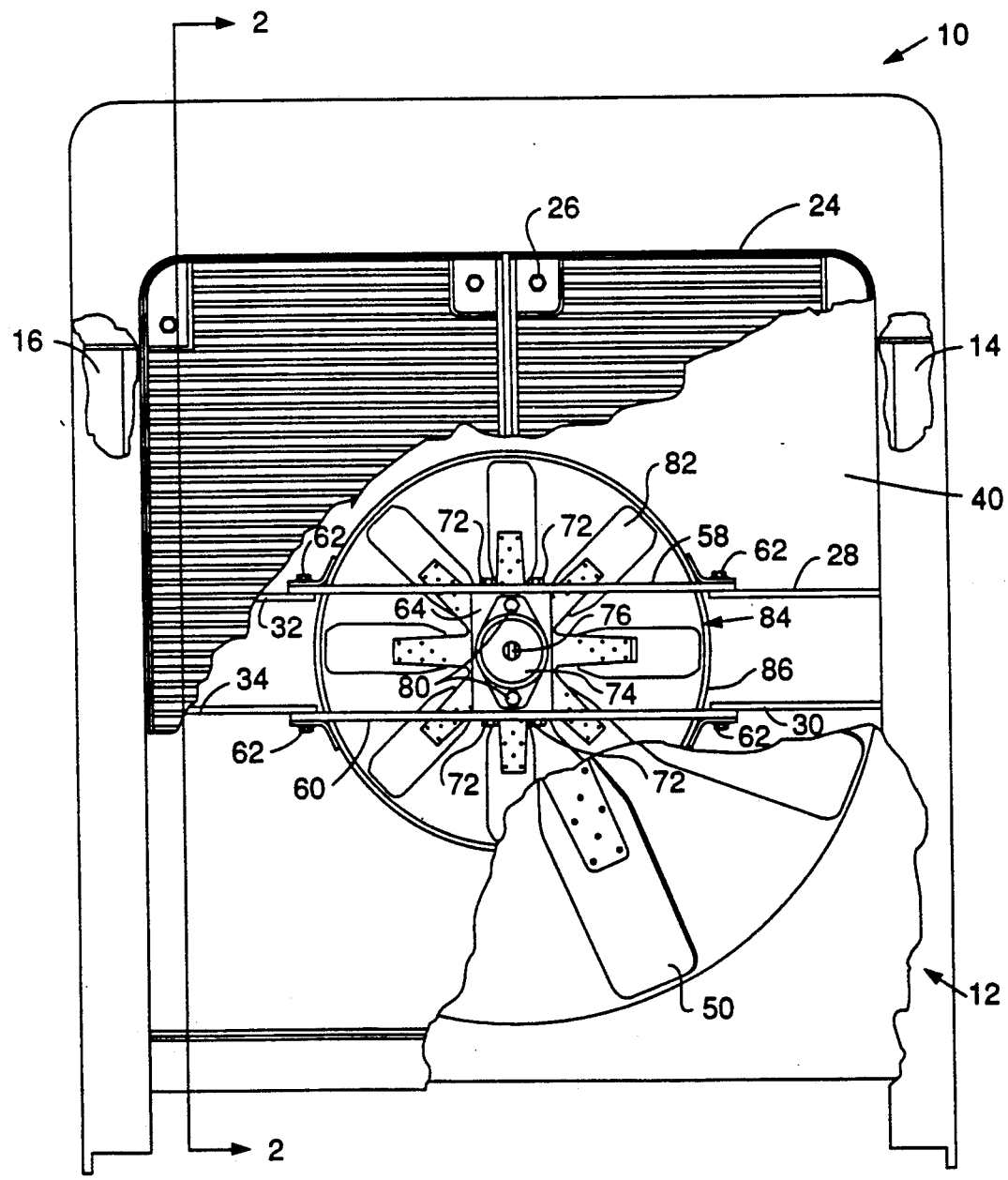
FIG. 1 is a diagrammatic partial front view of a vehicle embodying the present invention.

A pair of bars 58,60 are shown in FIG. 1 and are mounted to the supports 28,30,32,34 by a plurality of bolts 62. A block 64 is mounted to the bars 58,60 by another plurality of bolts 72. A fan drive motor 74 has a shaft 76 extending substantially along the axis 54 towards the heat exchanger 40. The motor 74 extends through the grill 24 and is connected to the block 64 by a pair of bolts 80 and may be driven electrically, hydraulically, mechanically, directly from the engine 42, or in any other suitable manner.

A secondary fan 82 is conventionally mounted on the shaft 76 of the motor 74 for joint rotation therewith. The secondary fan is mounted on the opposite side of the heat exchanger 40 at a location sufficient for pulling air through the heat exchanger 40 at an area L of lowest air flow in the direction given by the arrows shown in solid lines. The secondary fan 82 has a diameter d about half that of the primary fan 50 and is in a substantially concentric relation with the primary fan 50. The diameter d of the secondary fan is substantially equal to the lowest air flow area L of the heat exchanger 40.

A means 84 is provided for isolating the secondary fan 82 from the air circulated through the heat exchanger 40 by the primary fan 50. The means 84 can be, for example, a shroud 86 which encompasses the secondary fan 82 to substantially block air pushed through the heat exchanger 40 by the primary fan 50 from the secondary fan 82. The shroud 86 is mounted to the bars 58,60 through the plurality of bolts 62 and is located substantially within close proximity of the heat exchanger 40.

FIG. 3 is a diagrammatic illustration of the air velocity across the face of the heat exchanger for a prior art conventional single fan cooling system. The larger numbers signify greater air velocity. As can be seen, the air velocity is greatest at the perimeter of the heat exchanger corresponding with the peripheral portion of the fan and decrease to zero at the central portion of the heat exchanger corresponding generally to the central portion of the single fan.

FIG. 4 is a diagrammatic illustration of the air velocity across the face of the heat exchanger 40 for the present invention. The larger numbers, as in FIG. 3, signify greater air velocity. The air velocity is more evenly distributed across the face of the heat exchanger 40 resulting in greater total air flow through the heat exchanger 40.

INDUSTRIAL APPLICABILITY

During operation, the primary axial flow fan 50, being located on one side of the heat exchanger 40, pushes air through the heat exchanger 40 in a conventional manner. However, the primary fan 50, in a highly loaded condition, produces greater air flow G generally through the perimeter of the heat exchanger 40 and lower air flow L generally through the center of the heat exchanger 40. Therefore, the secondary fan 82 is located on the opposite side of the heat exchanger 40 at a location sufficient to pull air through the lowest air flow area L of the heat exchanger 40 so that the air flow is increased through that area. The diameter d of the secondary fan 82 should be substantially equal to the lowest air flow area L to increase air flow through the lowest air flow area L in an efficient manner. The secondary fan 82 also substantially eliminates the possibility of recirculation of air back through the heat exchanger 40. The shroud 86 encompasses the secondary fan 82 to substantially block air pushed through the heat exchanger 40 by the primary fan 50 from the secondary fan 82. Due to the location and mounting of the shroud 86, the secondary fan 82 is forced to pull air only through the heat exchanger 40, thereby, increasing the effectiveness of the secondary fan 82.

In view of the above, it is readily apparent that the present invention provides an improved cooling system in which total air flow capability is increased and recirculation is eliminated by the secondary fan. This is accomplished by locating the primary fan on one side of the heat exchanger and locating the secondary fan on the opposite side of the heat exchanger so that the secondary fan pulls air through the heat exchanger at the area of lowest air flow. The secondary fan improves the air flow capabilities through this area promoting an overall improvement in the performance of the cooling system. The shroud encompasses the secondary fan to substantially block air pushed by the primary fan through the heat exchanger from the secondary fan assuring that all the secondary fan air flow is drawn through the central portion of the heat exchanger.

Other aspects, objects, and advantages of this invention can be obtained from a study of the drawings, the disclosure, and the appended claims.

We claim:

1. A dual fan cooling system (38), comprising:

a heat exchanger (40);

a primary fan (50) having a predetermined diameter (D) rotatably mounted on one side of the heat exchanger (40) for pushing air through the heat exchanger (40) in a preselected direction, the primary fan (50) having a peripheral portion (P) which produces an area (G) of greatest air flow through the heat exchanger (40) and a central portion (C) which produces an area (L) of lowest air flow through the heat exchanger (40); and a secondary fan (82) having a predetermined diameter (d) smaller than the diameter (D) of the primary fan (50) and being rotatably mounted on the opposite side of the heat exchanger such that a substantially unobstructed flow path exists between said secondary fan and said heat exchanger, (40) at a location sufficient for pulling air through the heat exchanger (40) at the lowest air flow area (L) in the preselected direction and for substantially eliminating recirculation of air through the heat exchanger (40) in the opposite direction.

2. The dual fan cooling system (38) of claim 1, wherein the diameter (d) of the secondary fan (82) is about half the diameter (D) of the primary fan (50) and substantially equal to the lowest diameter of the air flow area (L).

3. The dual fan cooling system (38) of claim 2, wherein the secondary fan (82) is substantially concentrically mounted in relation to the primary fan (50).

4. The dual fan cooling system (38) of claim 1, includes means (84) for isolating the secondary fan (82) from the air pushed through the heat exchanger (40) by the primary fan (50).

5. The dual fan cooling system (38) of claim 4, wherein the isolating means (84) includes a shroud (86) encompassing the secondary fan (82) to substantially block air pushed through the heat exchanger (40) by the primary fan (50) from the secondary fan (82).

6. The dual fan cooling system (38) of claim 5, wherein the diameter (d) of the secondary fan (82) is about half the diameter (D) of the primary fan (50) and substantially equal to the diameter of the lowest air flow area (L).

7. The dual fan cooling system (38) of claim 6, wherein the secondary fan (82) is substantially concentrically mounted in relation to the primary fan (50).

8. A dual fan cooling system (38) for an internal combustion engine having a heat exchanger (40), comprising:

a primary fan (50) having a predetermined diameter (D) rotatably mounted on one side of the heat exchanger (40) for pushing air through the heat exchanger (40) in a preselected direction, the primary fan (50) having a peripheral portion (P) which produces an area (G) of greatest air flow through the heat exchanger (40) and a central portion (C) which produces an area (L) of lowest air flow through the heat exchanger (40); and a secondary fan (82) having a predetermined diameter (d) smaller than the diameter (D) of the primary fan (50) and being rotatably mounted on the opposite side of the heat exchanger such that a substantially unobstructed flow path exists between said secondary fan and said heat exchanger, (40) at a location sufficient for pulling air through the heat exchanger (40) at the lowest air flow area (L) in the preselected direction and for substantially eliminating recirculation of air through the heat exchanger (40) in the opposite direction.

9. The dual fan cooling system (38) of claim 8, wherein the diameter (d) of the secondary fan (82) is about half the diameter (D) of the primary fan (50) and substantially equal to the diameter of the lowest air flow area (L).

10. The dual fan cooling system (38) of claim 9, wherein the secondary fan (82) is substantially concentrically mounted in relation to the primary fan (50).

11. The dual fan cooling system (38) of claim 8, including means (84) for isolating the secondary fan (82) from the air pushed through the heat exchanger (40) by the primary fan (50).

12. The dual fan cooling system (38) of claim 11, wherein the isolating means (84) includes a shroud (86) encompassing the secondary fan (82) to substantially block air pushed through the heat exchanger (40) by the primary fan (50) from the secondary fan (82).

13. The dual fan cooling system (38) of claim 12, wherein the diameter (d) of the secondary fan (82) is about half the diameter (D) of the primary fan (50) and substantially equal to the diameter of the lowest air flow area (L).

14. The dual fan cooling system (38) of claim 13, wherein the secondary fan (82) is substantially concentrically mounted in relation to the primary fan (50).

* * * * *